(12) United States Patent
Uotila et al.

(10) Patent No.: US 12,476,356 B2
(45) Date of Patent: Nov. 18, 2025

(54) PANEL PROFILE AND METHOD FOR MANUFACTURING THEREOF

(71) Applicant: Exel Composites OYJ, Vantaa (FI)

(72) Inventors: Tiina Terhikki Uotila, Joensuu (FJ); Christoph Gilbert Lindström, Mikkeli (FI); Kim Matias Sjödahl, Söderkulla (FI)

(73) Assignee: EXEL COMPOSITES OYJ, Vantaa (FI)

( * ) Notice: Subject to any disclaimer, the term of this patent is extended or adjusted under 35 U.S.C. 154(b) by 235 days.

(21) Appl. No.: 18/044,308

(22) PCT Filed: Sep. 6, 2021

(86) PCT No.: PCT/FI2021/050594
§ 371 (c)(1),
(2) Date: Mar. 7, 2023

(87) PCT Pub. No.: WO2022/049330
PCT Pub. Date: Mar. 10, 2022

(65) Prior Publication Data
US 2023/0361457 A1    Nov. 9, 2023

(30) Foreign Application Priority Data
Sep. 7, 2020    (FI) .................................... 20205867

(51) Int. Cl.
*H01Q 1/42* (2006.01)
*B29C 70/52* (2006.01)
(Continued)

(52) U.S. Cl.
CPC .............. *H01Q 1/42* (2013.01); *B29C 70/52* (2013.01); *B29C 70/545* (2013.01); *B29C 70/68* (2013.01); *B29L 2031/3456* (2013.01)

(58) Field of Classification Search
CPC .......... H01Q 1/42; H01Q 1/427; B29C 70/52; B29C 70/545; B29C 70/68; B29C 70/70;
(Continued)

(56) References Cited

U.S. PATENT DOCUMENTS

| | | |
|---|---|---|
| 9,764,520 B2 | 9/2017 | Johnson et al. |
| 10,328,641 B1 | 6/2019 | Johnson et al. |

(Continued)

FOREIGN PATENT DOCUMENTS

| | | |
|---|---|---|
| CN | 103296411 A | 9/2013 |
| CN | 204299009 U | 4/2015 |

(Continued)

OTHER PUBLICATIONS

Finnish Search Report in U.S. Appl. No. 20/205,867, dated Mar. 30, 2021, 2 pages.

(Continued)

*Primary Examiner* — Dameon E Levi
*Assistant Examiner* — Michael M Bouizza
(74) *Attorney, Agent, or Firm* — Boone IP Law (57) ABSTRACT

The present disclosure describes a pultruded panel profile with a sandwich structure and a method of manufacturing such a panel profile. The sandwich structure has at least one a core layer and surface layers on both sides of the sandwich structure. The core layer comprises at least one signal window section made of a signal-transparent material, the signal-transparent material being substantially transparent to at least one wireless signal. The core layer further comprises a peripheral section surrounding the signal window section, the peripheral section having a different material composition than the signal window section.

9 Claims, 4 Drawing Sheets

(51) Int. Cl.
  B29C 70/54 (2006.01)
  B29C 70/68 (2006.01)
  B29L 31/34 (2006.01)
(58) Field of Classification Search
  CPC ............ B29C 70/88; B29L 2031/3456; B32B 2250/40; B32B 3/04; B32B 3/18; B32B 5/024; B32B 5/18; B32B 2307/412; B32B 5/26; B32B 2307/732; B32B 5/245; B29D 99/0021; C08J 7/04
  See application file for complete search history.

(56) References Cited

U.S. PATENT DOCUMENTS

| | | | |
|---|---|---|---|
| 10,644,391 B2 * | 5/2020 | Lavin | H01Q 7/00 |
| 2002/0014302 A1 | 2/2002 | Fanucci et al. | |
| 2011/0165363 A1 | 7/2011 | Wolf et al. | |
| 2014/0154452 A1 | 6/2014 | Kim | |
| 2015/0151496 A1 | 6/2015 | Kraatz et al. | |
| 2017/0165926 A1 | 6/2017 | Johnson et al. | |
| 2017/0301980 A1 * | 10/2017 | Lavin | H01Q 1/287 |
| 2019/0270263 A1 * | 9/2019 | Mukherji | B29D 99/0003 |
| 2019/0293052 A1 * | 9/2019 | Johnson | B29C 66/729 |
| 2021/0143538 A1 * | 5/2021 | Sjödahl | H01Q 1/424 |
| 2021/0210846 A1 * | 7/2021 | Sekiguchi | H01Q 1/422 |

FOREIGN PATENT DOCUMENTS

| | | |
|---|---|---|
| CN | 104993249 A | 10/2015 |
| CN | 110402520 A | 11/2019 |
| CN | 111231442 A | 6/2020 |
| EP | 3602686 A1 | 2/2020 |
| JP | H0724923 A | 1/1995 |
| WO | 2008070026 A1 | 6/2008 |
| WO | 2008147393 A1 | 12/2008 |
| WO | 2018172613 A1 | 9/2018 |

OTHER PUBLICATIONS

Machine translation of CN111231442A.
Machine translation of JPH0724923A.
PCT International Search Report and Written Opinion in PCT/FI2021/050594 dated Jan. 5, 2022, 3 pages.
Search Report issued by the State Intellectual Property Office of People's Republic for Application No. 202180065348.7 dated Aug. 29, 2025, 2 pages.
First Office Action issued by the State Intellectual Property Office of People's Republic for Application No. 202180065348.7 dated Aug. 29, 2025, with English translation, 18 pages.

* cited by examiner

PANEL PROFILE AND METHOD FOR MANUFACTURING THEREOF

CROSS-REFERENCE TO RELATED APPLICATIONS

This application is a National Phase entry of International Application No. PCT/FI2021/050594, filed Sep. 6, 2021, which claims priority to Finland Patent Application No. 20205867, filed Sep. 7, 2020, the disclosures of which are incorporated herein by reference in their entireties.

FIELD

The invention relates to pultruded panel profiles, and particularly to pultruded panel profiles with sandwich structure.

BACKGROUND INFORMATION

Pultrusion is a continuous process for manufacture of composite materials with uniform cross-section. In a pultrusion process, continuous fibres wetted in a resin are pulled through a heated mould. As the resin-wetted fibres are pulled through the heated mould, the heat causes the resin to harden, and thus, a continuous profile is formed. The shape of the mould defines the cross-sectional shape of the profile. In some applications, an additional core material may be supplied to the mould together with to the fibres. In this manner, more versatility can be introduced to functional characteristics of pultruded profiles. However, the introduction of a core material into a pultruded profile may significantly lower the mechanical characteristics of the profile. Further, depending on the price of the core material, the manufacturing costs may increase significantly.

BRIEF DISCLOSURE

An object of the present disclosure is to provide a panel profile and a method for manufacturing thereof so as to alleviate the above disadvantages. The object of the disclosure is achieved by a panel profile and a method which are characterised by what is stated in the independent claims. The preferred embodiments of the disclosure are disclosed in the dependent claims.

The present disclosure describes a method for manufacturing a pultruded panel profile. The method produces a panel profile with a sandwich structure that has core layer in the middle. The core layer is made of discrete core elements of a plurality of different types. The different types of core elements act as functional inserts in the composite. With the method according to the present disclosure, localized functionalities (such as a distinct signal window) can be formed in a predetermined position in a composite structure of the panel profile. At the same time, the continuous nature of the pultrusion process can be maintained.

BRIEF DESCRIPTION OF THE DRAWINGS

In the following the invention will be described in greater detail by means of preferred embodiments with reference to the attached drawings, in which.

DETAILED DISCLOSURE

The present disclosure describes a pultrusion method for manufacturing a continuous panel profile. In a pultrusion process, continuous fibres wetted in a resin are pulled through a heated mould. As the resin-wetted fibres are pulled through the heated mould, the heat causes the resin to harden, and thus, a continuous profile is formed. In the context of the present disclosure, the term "continuous profile" refers to a structure that continuously has the same exterior shape for its cross section throughout its length. However, the internal structure of the cross section may change along the length of the panel. The term "length" refers to the dimension of the panel profile extending in the direction of the pulling direction of the pultrusion process. Dimensions "width" and "thickness" are perpendicular to the length. The shape of the mould defines the shape of the cross section of the profile in the pultrusion process.

Figure 1:
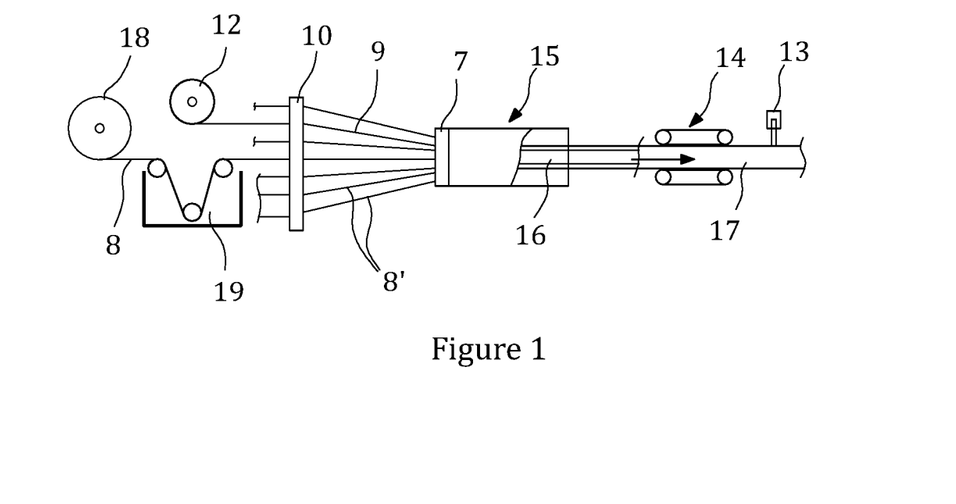
FIG. 1 shows an example of a pultrusion process.

FIG. 1 shows an exemplary embodiment of a pultrusion process. In FIG. 1, fibres 8 are pulled from reels 18 to be wetted in matrix resin 19. Resin-wetted fibres 8' are pulled into a heated mould 15. A core material 9 is pulled in the mould together with the fibres 8'. In FIG. 1, the core material 9 is guided from a reel 12. The fibres 8, 8' are guided only into surface layers of profile walls and the core material 9 is guided between the surface layers. Before entering the mould, the resin-wetted fibres 8' may pass through preforming guides 10 and a forming die 7 in order to guide the fibres to a desired configuration. The wetted fibres 8' and the core material 9 may also pass through a forming die 7 prior to the mould 15 in order to finalise the cross-sectional shape of the panel. As the fibres 8' and the core material 9 are pulled through the mould 15, a profile 17 is formed. As shown in FIG. 1, the profile has a core 16. The pulling is performed by the means of a pulling device 14. Finally, the pultruded continuous straight profile 17 may be chopped up at desired lengths by a cutting saw 13.

In the method according to the present disclosure, the core material comprises discrete core elements. The core material may be made of discrete core elements alone or the core material may be made of discrete core elements and other, continuous core elements (such as continuous nonwoven material). In either case, the method comprises providing a plurality of discrete core elements between two surface layers and pulling the surface layers and the core elements therebetween through a pultrusion process, thereby forming a continuous panel profile with a sandwich structure. The term "discrete core elements" refers to individual pieces of core material (or materials) that have predetermined shape and dimensions. The surface layers may be sheets of fibres, for example. The surface layers may be in the form of a woven, nonwoven, multiaxial, or random fiber material, for example. In a preferred embodiment, the surface layers are in the form of woven fabric. The term "sandwich structure" refers in this context to a structure where the core elements form a layer between the two surface layers. To form panels, the continuous panel profile may finally be cut, bent and/or otherwise formed to created predetermined shapes. For example, the continuous panel profile may be cut at predetermined lengths (e.g. by cutting saw as shown in FIG. 1).

Figure 2:
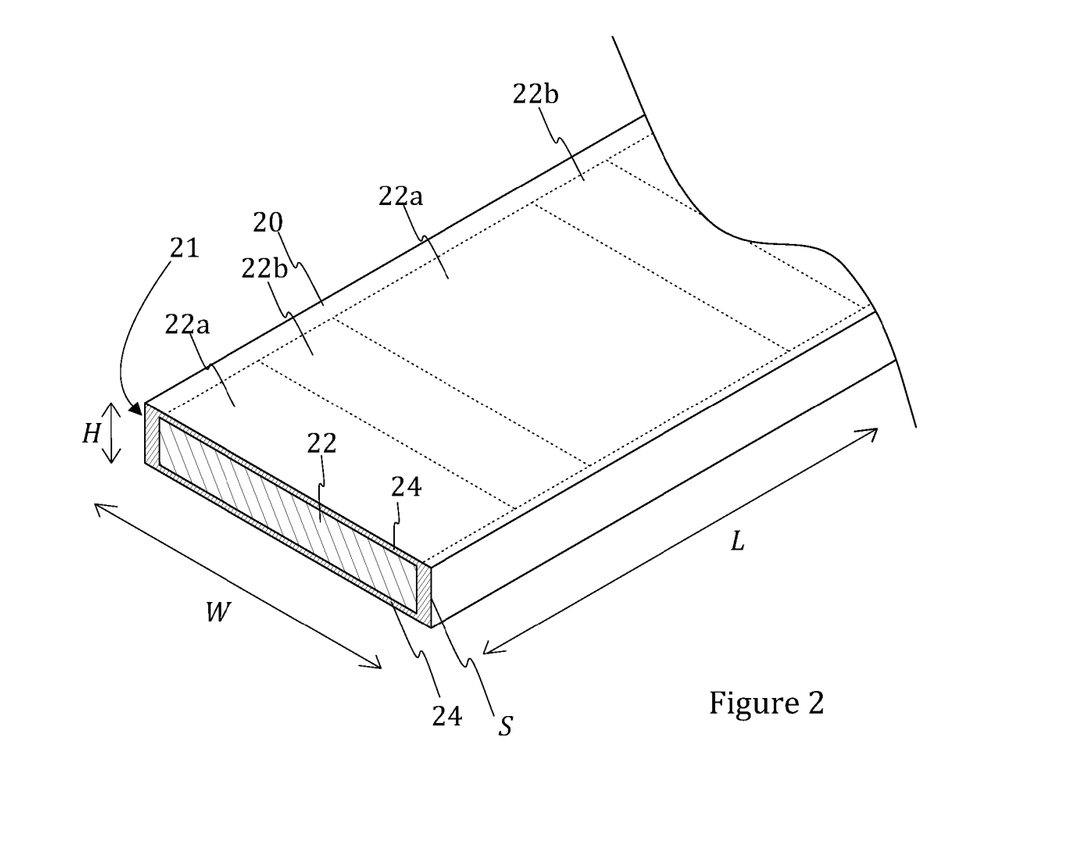
FIG. 2 shows a simplified example of a continuous panel profile according to the present disclosure.

FIG. 2 shows a simplified example of a continuous panel profile according to the present disclosure. In FIG. 2, a flat, continuous panel profile 20 has length L extending along the pulling direction. The profile 20 has width W extending perpendicularly to the length L. Further, FIG. 2 shows the profile 20 having thickness H that is perpendicular to the length L (and to the width W). The dimension "thickness" refers to a dimension extending through the layers of the panel profile. FIG. 2 shows a cut cross section 21 of the panel profile 20. The cross section 21 has a rectangular exterior shape S throughout the length L of the panel profile 20. In FIG. 2, the panel profile has a sandwich structure: a layer of core material 22 is positioned between two surface layers 24. While FIG. 2 shows a flat panel, the method and panels according to the present disclosure are not limited only to flat structures. For example, non-flat (e.g. curved) panels may also be produced with the method. Further, while FIG. 2 shows a panel with a simple rectangular cross-sectional exterior shape, other cross-sectional shapes can be used.

In order to achieve new functional properties to the panel profile, the discrete core elements in the method according to the present disclosure comprise at least two different types of elements. The different types may represent elements with different shapes, for example. For example, FIG. 2 shows (with dashed lines) that the core material is made of core elements 22a and 22b that have different shapes. In addition, or alternatively, the different types may represent elements made with different material compositions. For example, the different types of core elements may comprise at least a first element and a second element that have different material compositions. Glass fiber (composite), foam, wood, plastic, and metal are some examples of materials that can be used in the core elements. The materials of the core elements are preferably prepared to adhere to the composite material in the pultrusion process before supplying the core elements to the process.

In the method, the core elements are arranged to a desired sequence. The elements are supplied to the pultrusion process in said sequence. The sequence forms a pattern out of the core elements. This pattern may be a regular pattern, or it may be irregular. The pattern may be predetermined, or it may be randomized. With the pattern, localized functionalities can be defined for the panel profile. For example, a predetermined window, a reinforcement, or a disruption of material properties can be defined to specific portions of the panel profile. The sequence may define a plurality of different types of elements in at least the direction of the length of the panel profile. In some embodiments, the sequence may in addition define a plurality of different types of elements in the direction of the width and/or the thickness of the panel profile.

Figure 3A:
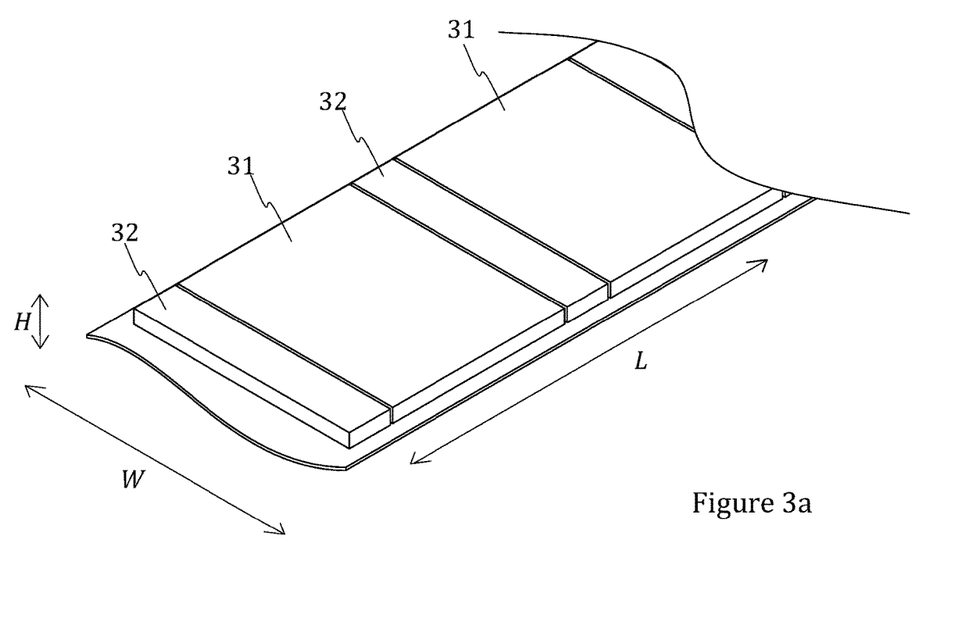
FIGS. 3a to 3c show exemplary arrangements of core elements according to the present disclosure.

For example, in a first embodiment, the core elements are arranged into a one-dimensional, lengthwise array of elements. FIG. 3a shows an example of such an embodiment. In FIG. 3a, two kinds of core elements 31 and 32 are arranged on a continuous carrier sheet 33. The core elements 31 and 32 have different shapes and/or may have different material compositions. The carrier 33 has length L that extends in the pulling direction during pultrusion process. The core elements 31 and 32 form a one-directional pattern that only alternates in the direction of the length L. The carrier has a width W but pattern is such that there is only one core element in the widthwise direction throughout the length L of the carrier 33.

Figure 3B:
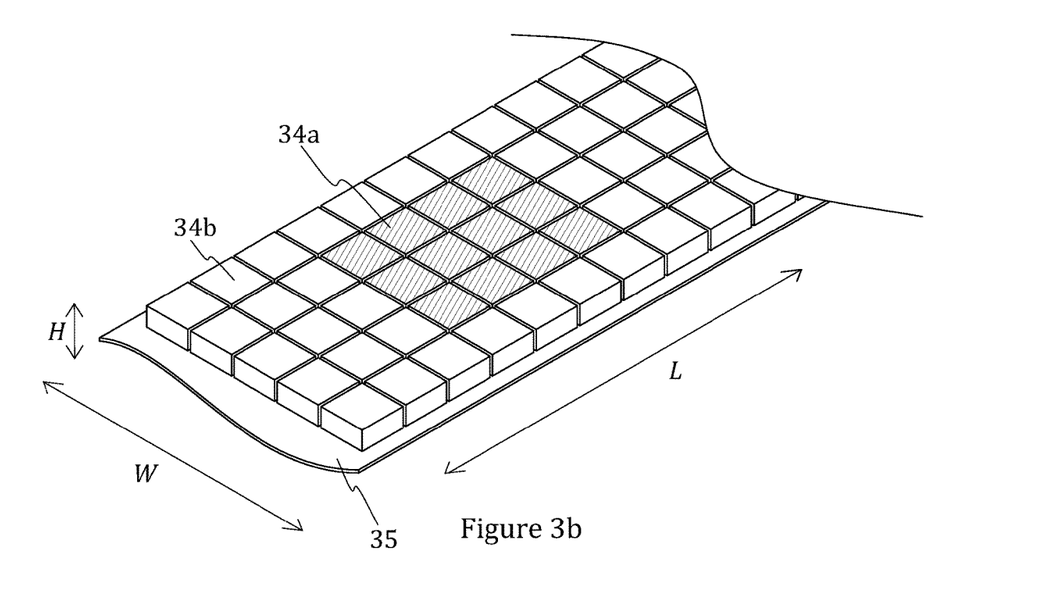

In a second embodiment, simple rectangular core elements are arranged into a two-dimensional array of elements. This array may extend in the direction of the length and the width of the panel profile, for example. Alternatively, the array may extend in the direction of the length and the thickness of the panel profile, for example. FIG. 3b shows an example of the second embodiment. In FIG. 3b, a plurality of discrete core elements 34a and 34b are arranged into a two-dimensional array on a carrier 35. The two-dimensional array extends in the direction of the length L and also in the direction of the width W of the carrier 35. In other words, the pattern also has at least two core elements in the widthwise direction. In FIG. 3b, two different types of core elements are being used. A first type 34 is shown as elements with hatched surfaces. A second type 34b is shown as white elements. For simplicity, only one of each core element type is marked with a reference number in FIG. 3b. These two types represent core elements with different materials or material compositions.

While FIG. 3b shows all core elements having the same shape, the core elements can also have different shapes. The core elements made of different material may have different shapes, for example. Core elements of the same material can also have different shapes. Further, while FIG. 3b shows only two different materials being used, any plurality of core element types with different materials can be used. These aspects apply to all sequences and patterns of core elements discussed in the present disclosure. In other words, the number of different shapes and materials used can be any plurality of shapes and/or materials.

Figure 3C:
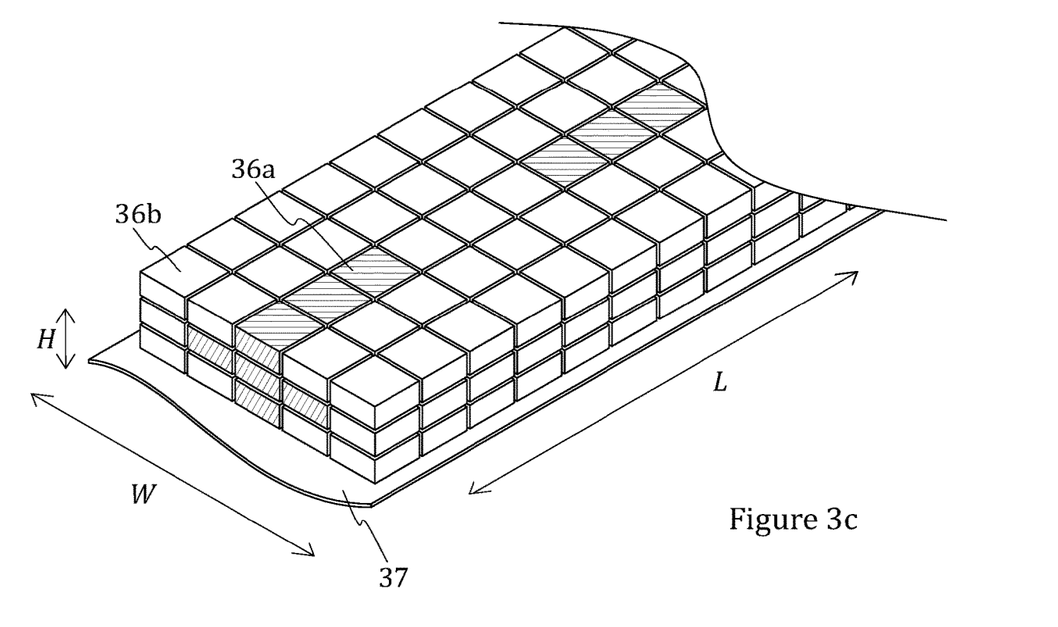

In a third embodiment, the core elements are arranged into a three-dimensional array of elements. This array may extend in the direction of the length, the width and the thickness of the panel profile. FIG. 3c shows an example of the third embodiment. In FIG. 3c, a plurality of discrete core elements 36a and 36b are arranged into a three-dimensional array on a carrier 37. The three-dimensional array extends in the direction of the length L, the width W, and the thickness H of the carrier 37. In other words, the pattern has at least two core elements in the directions of the length L, width W and the thickness H of the carrier 37. In FIG. 3c, two different types of core elements are being used. A first type 36a is shown as elements with hatched surfaces. A second type 36b is shown as white elements. For simplicity, only one of each core element type is marked with a reference number in FIG. 3c. These two types represent core elements with different materials or material compositions.

In some embodiments, the discrete core elements are prepared into a premade continuous core material and supplying them to the pultrusion process. The method according to the present disclosure may comprise attaching the core elements to a continuous carrier to form a predetermined (or a random) sequence on the carrier. The core elements may be adhered to the carrier mechanically, thermally or chemically, for example. Some examples of attaching means are: gluing, thermal bonding, needle punching, stitching, and thermal welding. The core elements may then be supplied to the pultrusion process on the carrier. For example, as already shown in FIGS. 3a to 3c, the carrier may be a continuous sheet and the core elements may be mounted on a carrier. The sheet may be in the form of a veil, a fabric, a mat, a scrim or an NCF (non-crimp fabric), for example. The carrier may go through the pultrusion process together with the core elements, and thus become a part of the manufactured panel profile.

Alternatively, the carrier may be in the form of at least one continuous thread, string, or wire attaching the core elements to each other. For example, one or more threads, strings, or wires may be used to weave the core elements together to form the premade core material in the form a continuous mat of core elements, where the core elements are arranged to a sequence. The premade core material is preferably prepared in the form of a ductile, continuous mat.

In this manner, the core material can be rolled into a roll. The core material can then be more easily supplied to the pultrusion from the roll.

In some embodiments, the core elements may be supplied separately without using a carrier. For example, an automated supply system may be arranged to supply core elements to the pultrusion process. In some embodiments, a standard programmed pick-and-place manipulator can be used, depending on the materials and accuracy requirements.

The above-discussed manufacturing method and the panel profile produced with the method can be used in a large variety of different applications. In a first embodiment, the method is used to manufacture a cover panel with a signal window. A cover panel may be a part of a protective casing that protects delicate equipment (such as electronics) from the surrounding environment, for example. A signal window refers to a predefined section of the cover panel through which a wireless signal can pass. In this context, the term "wireless signal" refers to a wirelessly transmitted signal, such as a radiofrequency (RF) signal, an ultrasound signal or an infrared (IR) signal.

In the first embodiment of the method according to the present disclosure, the method comprises providing a pultrusion process with a plurality of discrete core elements between two surface layers, thereby forming a continuous cover panel profile with a sandwich structure. The continuous cover panel profile at may then be cut to predetermined lengths to form the cover panel.

The discrete core elements comprise at least a first element and a second element in the first embodiment. The first element may be made of a signal-transparent material that is being substantially transparent to at least one wireless signal. For example, in case of RF applications, one or more low dielectric (DK) materials, such as natural or synthetic cellular materials, may be used as the material of the first element. Closed-cell plastic foam, cork, balsa wood, and synthetic fibers are some examples of the aforementioned cellular materials.

However, the signal-transparent material may have low mechanical characteristics which could cause lower total performance and local weakness of the structure. Therefore, the second element may have a different material composition than the first element. The material composition of the second element may be selected based on other characteristics, such as mechanical characteristics, instead of its signal transparency characteristics. For example, the material of the second element may be selected to have higher mechanical strength than the material of the first element, and the second element may be configured to act as a reinforcing element in the cover panel.

In order to form the cover panel with the signal window, the first and second core elements may be arranged to a sequence. The sequence defines the signal window in the form of at least one first element (at least partially) surrounded by at least one second element. In some embodiments, the at least one first element is completely surrounded by the at least one second element so that the at least on second element forms a closed loop around the at least one first element. However, in some embodiments, the second element or elements surround the first element or elements only partially.

As discussed earlier, the core elements may be mounted on a continuous carrier in the order of the sequence and supplied to the pultrusion process on the carrier in the form of a continuous core material. Alternatively, an automated supply system may supply the core elements to the pultrusion system as separate core components.

Figure 4A:
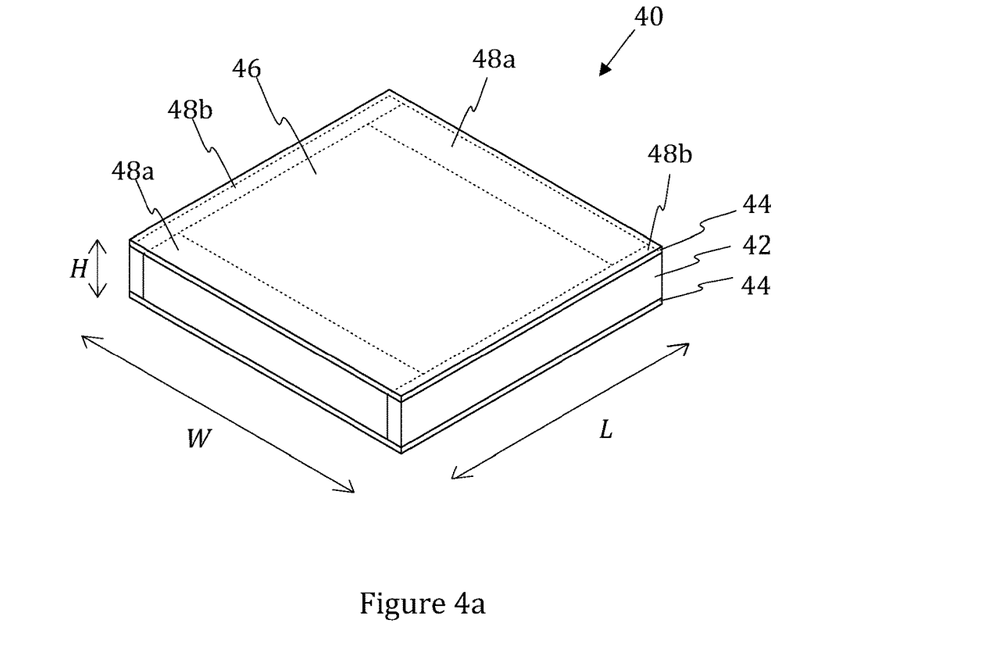
FIGS. 4a and 4b show a cover panel with a signal window according to the present disclosure.
Figure 4B:
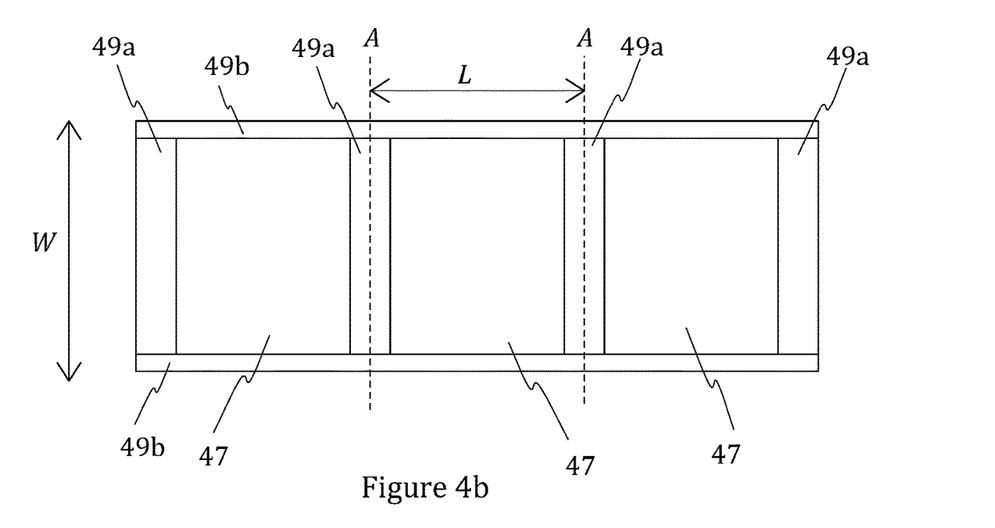

FIGS. 4a and 4b show a cover panel with a signal window, produced with the first embodiment of the method according to the present disclosure. In FIG. 4a, a cover panel 40 has a pultruded sandwich structure with a core layer 42 and surface layers 44 on both sides of the sandwich structure. The sandwich structure has a length L extending along pultrusion direction and a width W perpendicular to the length L.

The core layer 42 comprises a signal window section 46 made of a signal-transparent material. The signal window section is preferably defined by a united group of one or more core elements made of the signal-transparent material. The signal-transparent material is substantially transparent to at least one wireless signal. The core layer 42 further comprises a peripheral section around the signal window section in FIG. 4a. The peripheral section may be made from one or more core components. It has a different material composition than the signal window section 46. It may be made of one or more core elements. The peripheral section may comprise first, lengthwise peripheral portions 48b extending along the length L of the sandwich structure on both widthwise sides of the signal window section 46. The peripheral section may further comprise second, widthwise peripheral portions 48a extending along the width of the sandwich structure on both lengthwise ends of the signal window section 46. In FIG. 4a, portions 48a, 48b thus form a peripheral section that completely surrounds the signal window section 46. The material or materials of the peripheral section may be mechanically stronger than the material of the signal window section so that signal window section 46 is supported by reinforced elements from each side.

FIG. 4b shows manufacturing of a cover panel as shown in FIG. 4a from a panel profile 41 having a sandwich structure. Length L of the profiles extends along the pultrusion direction and width L is perpendicular to the length L. The panel profile 41 may be produced with the method according to the present disclosure. The method may comprise providing signal-transparent elements 47 made of signal-transparent material and reinforcing elements made of reinforcing material. Some of the reinforcing elements may be in the form of widthwise reinforcing elements 49a extending along the width W of the panel profile. The widthwise reinforcing elements 49a are positioned at both lengthwise ends of each signal-transparent element 47. In addition, continuous lengthwise fibres 49b extending along the length of the panel profile may be provided together with the signal-transparent elements 47 and the widthwise reinforcing elements 49a. These lengthwise fibres being positioned on both widthwise sides of the signal-transparent elements 47 and the widthwise reinforcing elements 49a.

In FIG. 4b, cutting lines A run at the middle of the widthwise reinforcing elements 49a. When the panel profile is cut at the predefined positions A, cover panels as shown in FIG. 4a are formed. A signal-transparent element 47 in FIG. 4b then forms the signal window section 46 of the panel 40 in FIG. 4a. The lengthwise peripheral portions 48b in FIG. 4a comprise reinforcing structures made of the continuous fibres 49b extending in the lengthwise direction. At the same time, the widthwise peripheral portions 48a in FIG. 4a comprise reinforcing structures made of the widthwise reinforcing elements 49a.

While FIGS. 4a and 4b show a flat, rectangular cover panel with one rectangular signal window in the middle of the pane, the method according to the present disclosure can be used for other kinds of implementations. For example, the dimensions and the position of the signal window can be easily adjusted in the method. Further, the shape of the signal window is not limited to rectangular shape. A core element or a united group of core elements may define a more complex shape for the signal window. In addition, the number of signal windows in a cover panel is not limited to one window. A panel can be configured to have a plurality of signal windows by adjusting the shape of the core elements and the pattern to which the core elements are arranged.

The above-discussed embodiment of a cover panel with a signal window may be used in various wireless communication applications. For example, the cover panel may be a cover panel of a radome. A radome may be in the form of a protective casing that protects an RF antenna (or antenna array) from ambient environment. At the same time, the RF signals can penetrate through at least parts of the radome. For this purpose, the signal window section may be made a RF-transparent material. The signal window section may be formed out of core elements made of closed-cell plastic foam or other low DK material. However, as the RF-transparent material may be mechanically fragile, the cover panel may comprise at least one reinforcing material in the peripheral section around the signal window section.

In new wireless communications systems, higher and higher signal frequencies are being used. For example, in 5G cellular networks, the nominal signal frequencies may be in the range of few gigahertz's (e.g. 2.1-3.7 GHz) or even in the range of tens of gigahertz's (e.g. 25-100 GHz). At these frequency ranges, the wavelength of the wireless signal is in the range of centimetres or even millimetres, respectively. When the wavelength is in this kind of range, the thicknesses of the layers of the sandwich structure may influence the quality of the signal passing through the sandwich structure. An RF signal traveling through the signal window section may be degraded because of signal reflections in the sandwich structure of the signal window.

In a preferable embodiment of a cover panel of a radome as discussed above, the RF signal is assumed to be in a nominal signal frequency range of an antenna in the radome. In order to minimise degradation of an RF signal traveling through the signal window section caused by signal reflections in the sandwich structure of the signal window. In order to minimise the signal degradation of the RF signal in the signal window section, the thickness of the signal window section is configured to correspond with a length of one or multiple quarters of an effective wavelength of the RF signal. The phrase "one or multiple quarter of an of an effective wavelength" refers to a positive natural number of quarter wavelengths $\lambda_{eff}/4$ of an effective wavelength $\lambda_{eff}$. The term "effective wavelength" refers to the wavelength of RF signal in the material of the signal window. In case of a closed-cell plastic foam, for example, the thickness of the thickness of the foam is 0.1-50 mm, depending on the nominal signal frequency range. In some embodiments, the thickness of surface layers of the sandwich structure was assumed to be very thin (compared to the core layer) that surface layers do not cause significant reflections. The thickness of the surface layers is 0.1-5 mm, for example. Thus, the thickness of the sandwich layer may be essentially the same as the thickness of the core layer, and only the thickness of the core layer may be optimized as discussed above. However, in some embodiments, thicknesses of each layer of the sandwich structure of the signal window may be optimized with respect to the signal reflections.

In addition to minimising reflections in the sandwich structure, the signal quality may be improved by selection of the material of the surface layers. If the wavelength is short (in the range of centimetres or millimetres), even small irregularities in the thickness and structure of the layers may influence the signal quality. In order to minimise the irregularities, the surface layers are therefore preferably made of woven fabric.

The above-discussed cover panel with a signal window may be used in a variety of different applications. For example, the cover panel may be used in a telecommunication antenna arrangement, for example. The telecommunication antenna arrangement may be a 5G antenna array, for example. The arrangement may comprise an antenna (or an array of antennas) and a radome protecting the antenna. The radome may comprise the cover panel. The thickness of the signal window section of the cover panel is preferably configured to correspond with a length of one or multiple quarters of wavelength a RF signal traveling through the signal window section. Said RF signal may be sent and/or received by the antenna and may thus have a frequency in an operating frequency range of the antenna.

While the above paragraphs mostly discuss embodiments with a core layer having a simple rectangular cross section, the method and panels according to the present disclosure are not limited only to such embodiments. For example, in some embodiments according to the present disclosure, the thickness of a core layer may change along the width of the panel profile. Different characteristics can be formed to specific regions of the panel, and even to specific regions a signal window in the panel. This may be advantageous when the panel is a cover panel for a radome that comprises a plurality of antennas operating at different frequencies. In this manner, characteristics of a signal window (or a portion of a signal window) may be tailored for each antenna in the radome.

Also, while the embodiments discussed above mostly describe the use of a single core layer (made of one-dimensional, two-dimensional or three-dimensional array of elements), the method and panels according to the present disclosure are not limited only to such embodiments. In the method and panels according to the present disclosure, the sandwich structure may also comprise a plurality core layers positioned on top of each other. In some embodiments, the sandwich structure may further comprise one or more core layers made of other core materials than those discussed above. Those other core materials include continuous core materials. Different core layers may be separated by separating layers that are positioned between the core layers. The separating layers may be made of the same materials as the surface layers, for example. A simple example of an embodiment with a plurality of core layers may comprise a stack of layer (from bottom to top): surface layer, first core layer, separating layer, second core layer, surface layer. Alternatively, different core layers may be positioned directly on top of each other. A simple example of an embodiment with a plurality of core layers, but no separating layers, may comprise a stack of layer (from bottom to top): surface layer, first core layer, second core layer, surface layer. The method and panels according to present disclosure are not limited to these examples. Instead, any plurality and combination of the core layers may be used.

Further, while the above paragraphs discuss a cover panel according to the present disclosure mostly in relation to a radome, other functionalities may also/alternatively be formed with the method according to the present disclosure.

For example, in addition a cover panel of a radome, the method according to the present disclosure may be used to manufacture a smart bus panel. Modern busses may utilize various wireless communications devices. Conventionally these devices have been positioned inside the bus and glass windows of a bus have served as signal windows for the devices. However, as selective glass (i.e. glass allowing only certain wavelength, such as visible light, to pass) has become more common, signals of the wireless communications positioned inside the bus may have poor signal strength. It may therefore be desirable to able to position the wireless communications devices elsewhere. With the method according to the present disclosure, a local signal window (or windows) can be formed to outside panel of a bus without compromising other requirements (such as thermal insulation characteristics and mechanical strength) of the panel.

Further, in addition to active signalling, the method according to the present disclosure can be used for manufacturing a panel with a local window that allows passive monitoring of surrounding. This may be desirable in security applications, for example. Instead of having a visible camera, a heat sensor camera could be positioned behind a façade of a building and monitor an area where for instance humans should not be and raise and alarm when a heat signature is detected.

In yet another embodiment, the method according to the present disclosure can be controlling local thermal characteristics of an object. With the method according to the present disclosure, a panel with tailored local thermal characteristics can be formed. For example, with discrete core elements as described above, thermal characteristics of the panel can be locally tailored so that one part of the panel provides a different level of thermal insulation than another part of the panel. This kind of panel has a large variety of uses, e.g. in housing (building insulation) and in transportation (vehicle insulation).

It is obvious to a person skilled in the art that the panel profile and the method according to the present disclosure can be implemented in various ways. The invention and its embodiments are not limited to the examples described above but may vary within the scope of the claims.

What is claimed is:

1. A cover panel of a radome with a signal window, wherein
    the cover panel has a pultruded sandwich structure with at least one a core layer and surface layers on both sides of the sandwich structure, the sandwich structure having a length extending along the pultrusion direction of the sandwich structure and a width perpendicular to the length,
    the core layer comprises at least one signal window section made of an RF-transparent material,
    the core layer further comprises a peripheral section comprising at least one reinforcing material and surrounding the signal window section, the peripheral section having a different material composition than the signal window section and comprising:
        lengthwise peripheral portions extending along the length of the sandwich structure on both widthwise sides of the signal window section; and
        widthwise peripheral portions extending along the width of the sandwich structure on both lengthwise ends of the signal window section, the widthwise peripheral portions comprising reinforcing structures made of discrete reinforcing elements which comprise the at least one reinforcing material and which have a main extension in a widthwise direction.

2. The cover panel according to claim 1, wherein the lengthwise peripheral portions comprise reinforcing structures made of continuous fibres having a main extension in a lengthwise direction.

3. The cover panel according to claim 2, wherein the thickness of the signal window section is configured to correspond with a length of one or multiple quarters of an effective wavelength of an RF signal traveling through the signal window section, the RF signal being in a nominal signal frequency range of an antenna in the radome.

4. The cover panel according to claim 1, wherein the signal window section is made of one or more natural or synthetic cellular materials.

5. The cover panel according to claim 4, wherein the fibres of the surface layers are in the form of woven fabric or layers thereof.

6. The cover panel according to claim 5, wherein the thickness of the foam is 0.1-50 mm and the thickness of the surface layers is 0.1-5 mm.

7. A telecommunication antenna arrangement comprising an antenna and a radome protecting the antenna, wherein
    the radome comprises a cover panel according to claim 1,
    the thickness of the signal window section of the cover panel corresponds with a length of one or multiple quarters of wavelength an RF signal traveling through the signal window section, the RF signal having a frequency in a nominal signal frequency range of the antenna.

8. A pultrusion method for manufacturing a cover panel of a telecommunication antenna radome with a signal window, the method comprising
    providing a plurality of discrete core elements between two surface layers,
    pulling the surface layers and the core elements therebetween through a pultrusion process, thereby forming a continuous cover panel profile with a sandwich structure, the panel profile having a length extending along the pultrusion direction of the panel profile and a width perpendicular to the length,
    cutting the continuous cover panel profile at predetermined lengths to form the cover panel,
    wherein
    the discrete core elements comprise at least two different types of elements, the two different types including an RF-transparent element type and a reinforcing element type, and
    the core elements are arranged to a sequence so that the panel profile has a signal window in the form of at least one RF-transparent element surrounded by reinforcing elements from each side, the reinforcing elements comprising:
        widthwise reinforcing elements extending along the width of the panel profile, the widthwise reinforcing elements being positioned at both lengthwise ends of each RF-transparent element, the widthwise reinforcing elements being discrete reinforcing elements which comprise at least one reinforcing material and which have a main extension in a widthwise direction; and
        continuous fibres extending along the length of the panel profile, the continuous fibres being positioned on both widthwise sides of the at least one RF-transparent element and the widthwise reinforcing elements.

9. The method according to claim 8, wherein the method comprises
    mounting the core elements on a continuous carrier in the order of the sequence, and
    supplying the core elements to the pultrusion process on the carrier.

* * * * *